United States Patent [19]

Taylor et al.

[11] Patent Number: 5,459,183

[45] Date of Patent: Oct. 17, 1995

[54] LOW VOC FURAN RESINS AND METHOD OF REDUCING VOCS IN FURAN RESINS

[75] Inventors: Thomas J. Taylor; William H. Kielmeyer, both of Englewood, Colo.

[73] Assignee: Schuller International, Inc., Denver, Colo.

[21] Appl. No.: 64,830

[22] Filed: May 19, 1993

[51] Int. Cl.[6] .............................. C08K 5/21; C08K 5/29; C08K 5/34
[52] U.S. Cl. ...................... 524/211; 524/210; 524/195; 524/100
[58] Field of Search ................... 524/211, 210, 524/195, 100

[56] References Cited

U.S. PATENT DOCUMENTS

| | | | |
|---|---|---|---|
| 2,343,972 | 3/1944 | Harvey | 260/67 |
| 2,397,453 | 3/1946 | White et al. | 260/8 |
| 2,487,394 | 11/1949 | Stierli | 260/45.2 |
| 2,510,496 | 6/1950 | Carlin | 260/70 |
| 2,521,532 | 9/1950 | Mitman et al. | 260/17.4 |
| 2,723,209 | 11/1955 | Philipps | 117/126 |
| 2,830,971 | 4/1958 | Brown et al. | 260/67 |
| 2,861,980 | 11/1958 | Fischer | 260/71 |
| 3,145,438 | 8/1964 | Kottke et al. | 22/193 |
| 3,222,315 | 12/1965 | Singer | 260/39 |
| 3,491,041 | 1/1970 | Dornte | 260/18 |
| 3,594,345 | 7/1971 | Brown et al. | 260/37 |
| 3,681,286 | 8/1972 | Brown et al. | 260/67 |
| 3,793,286 | 2/1974 | Peterson et al. | 260/38 |
| 3,813,371 | 5/1974 | Bozer et al. | 260/88.5 |
| 3,816,375 | 6/1974 | Bozer et al. | 260/67 |
| 3,850,727 | 11/1974 | Bozer et al. | 156/335 |
| 3,888,816 | 6/1975 | Brown et al. | 260/39 |
| 3,893,964 | 7/1975 | Kawai et al. | 260/29.4 |
| 3,914,192 | 10/1975 | Flautt et al. | 260/4 R |
| 3,925,286 | 12/1975 | Fahey | 260/29.3 |
| 3,927,139 | 12/1975 | Bozer et al. | 260/37 |
| 4,017,461 | 4/1977 | Dunlop et al. | 260/67 |
| 4,021,401 | 5/1977 | Jeppsen | 260/37 |
| 4,053,447 | 10/1977 | Shea | 260/38 |
| 4,076,873 | 2/1978 | Shea | 428/35 |
| 4,134,442 | 1/1979 | Laitar | 164/43 |
| 4,137,387 | 1/1979 | Misertis et al. | 526/62 |
| 4,154,797 | 5/1979 | Misertis et al. | 422/131 |
| 4,178,273 | 12/1979 | Brown | 260/29.4 |
| 4,212,909 | 7/1980 | Brown | 427/393.5 |
| 4,243,780 | 1/1981 | Kruglikov et al. | 260/829 |
| 4,283,462 | 8/1981 | Meyer et al. | 428/506 |
| 4,291,088 | 9/1981 | Wolff | 428/313 |
| 4,309,512 | 1/1982 | Mikogami et al. | 525/58 |
| 4,361,613 | 11/1982 | Bogner et al. | 428/119 |
| 4,426,460 | 8/1982 | Pentz | 321/115 |
| 4,430,459 | 2/1983 | Akerberg et al. | 523/144 |
| 4,439,348 | 3/1984 | Akerberg | 252/426 |
| 4,463,043 | 7/1984 | Reeves et al. | 428/68 |
| 4,548,752 | 10/1985 | Pentz | 260/330.9 |
| 4,640,934 | 2/1987 | Michel | 521/103 |
| 4,735,974 | 4/1988 | Mandorf | 523/141 |
| 4,761,441 | 8/1988 | Woodson | 523/439 |
| 4,832,723 | 5/1989 | Shisler et al. | 65/14 |

FOREIGN PATENT DOCUMENTS

| | | | |
|---|---|---|---|
| 1200336 | 2/1986 | Canada | C08L 59/00 |
| 2010532 | 3/1975 | Germany . | |
| 565340 | 10/1944 | United Kingdom . | |
| 626645 | 7/1949 | United Kingdom . | |
| 954084 | 4/1964 | United Kingdom . | |
| 1457216 | 12/1976 | United Kingdom | C08K 5/54 |

OTHER PUBLICATIONS

F. H. Newth et al., 2,5–Bishydroxymethylfuran, Research Supplement 3–I, Research Correspondence, 1950, pp. 50–51.

R. T. Conley et al., An Investigation of the Structure of Furfuryl Alcohol . . . Spectroscopy, J. of Applied Polymer Science, vol. 7, 1963, pp. 37–52.

Furan Polymers, Reprint from Encyclopedia of Polymer Science and Technology, vol. 7, 1967, pp. 432–445.

E. M. Wewerka et al., A Study of the Low Molecular Weight Components of Furfuryl Alcohol Polymers, J. of Applied Polymer Science, vol. 13, 1971, pp. 1437–1451.

C. R. Schmitt, Polyfurfuryl Alcohol Resins, Polymer–Plast. Technol. Eng., 3(2), 1974, pp. 121–158.

(List continued on next page.)

Primary Examiner—Kriellion S. Morgan
Attorney, Agent, or Firm—Cornelius P. Quinn

[57] ABSTRACT

The present invention relates to furan resins having low levels of VOCs. The claimed furan resins are the reaction product of a source of ammonia and a first reaction product, said first reaction product being derived from the reaction between a source of reactable formaldehyde, a formaldehyde scavenger, and an acidic furan resin resulting from the polymerization reaction wherein at least one reagent is selected from the group consisting of the furan containing molecule having the general formula

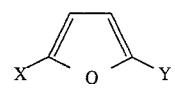

and its saturated analogs thereof having zero to one carbon-carbon double bonnets, wherein X and Y are independently comprised of organic molecular groups.

The invention further pertains to a method of decreasing formaldehyde in undesirable volatile organic compounds in furan resins, consisting of the steps of providing an acidic aqueous compatible furan resin, providing a source of reactable formaldehyde, mixing a formaldehyde scavenger with the furan resin in the presence of the source of reactable formaldehyde to form a first mixture, heating the first mixture to a temperature of less than 100° C. for a period of from one to ten hours, adding a source of ammonia to the first mixture to form a second mixture, and heating the second mixture to a temperature of less than 100° C. for a period of from one to ten hours.

13 Claims, No Drawings

OTHER PUBLICATIONS

R. H. Leitheiser et al., Water Dilutable Resin Binder For Particleboard, presented at "Wood Adhesives . . . Needs", Symposium, Madison, Wis., Sep. 23–25, 1980, pp. 59–64. Furan Derivates, vol. 11, 1980, pp. 499–527.

Z. Laszlo–Hevdig et al., Some Kinetic Features of the Initial Stage of the Acid–Catalyzed . . . 1, Die Angewandte Makromolekulare Chemie, 107, 1982, pp. 61–73.

J. P. Pfau et al., Heat–Initiated Furan Resin For Rapid Runway Repair, ESL–TR–82–37, AFESC, Tyndall Air Force Base, Fla. Aug. 1983, pp. 1–24.

Z. Laszlo–Hedvig et al., Some Kinetic Features of the Initial Stage of Acid–Catalyzed . . . II*, Die Angewandte Makromolekulare Chemie. 122, 1984, pp. 51–59.

QO Chemicals, Inc., Material Safety Data Sheet, for QUA-CORR™ 1300 Resins, Apr. 12, 1989, one page.

QO Chemicals, Inc., Material Safety Data Sheet for Furfuryl Alcohol, Jun. 23, 1989, two pages.

A. Gandini, Polymers and Oligomers Containing Furan Rings, Agricultural and Synthetic Polymers, 1990, pp. 195–208, Developed from TX Symposium Apr. 9–14, 1989.

QO Chemicals, Inc., Versatile Chemicals from Nature brochure, 1990, six pages.

The Quaker Oats compay—Chemicals Division, Material Safety Data Sheets, for Fa–RezB–260, two pages.

LOW VOC FURAN RESINS AND METHOD OF REDUCING VOCS IN FURAN RESINS

FIELD OF THE INVENTION

This invention relates to furan resins having low levels of volatile organic compounds (VOCs), and methods of making the same.

BACKGROUND OF THE INVENTION

The process of manufacturing glass fiber compositions typically involves spraying large volumes of phenol formaldehyde binders into high volume air streams, and then curing the product in convection ovens that involve high volumes of air. As a result, fiberglass manufacturers have an urgent need to reduce their VOC emissions, particularly with regard to formaldehyde.

Attempts at reducing the free formaldehyde content of traditional phenol formaldehyde binders have been unsuccessful because excess formaldehyde is essential to curing and bonding in such systems. Techniques such as scrubbing and incineration require substantial financial expenditures with no guarantee of success.

Attempts to convert free formaldehyde into less obnoxious and dangerous chemicals have involved the addition of ammonia or urea. Such additions are intended to convert free formaldehyde into hexamethylenetetramine or a mixture of mono and dimethylol ureas (MMU and DMU). Unfortunately, however, urea, hexamethylenetetramine, and mono and dimethylol ureas can all contribute to the production of trimethylamine, which gives cured fiberglass products an undesirable fishy odor.

As a result, an alternative to phenol formaldehyde based fiberglass binders has long been sought. Attempts to utilize aqueous compatible furan resin based fiberglass binding compositions have been successful in achieving some reductions in VOC emissions. However, it is desirable to reduce the levels of volatile organic compound in furan resins so as to be as low as possible.

Accordingly, it is an object of the present invention to provide a furan resin for use in glass fiber binding compositions which has reduced levels of volatile organic compounds.

It is a further object of the present invention to provide a method of reducing volatile organic compounds in furan resins.

SUMMARY OF THE INVENTION

The present invention relates to furan resins having low levels of VOCs. The claimed furan resins are the reaction product of a source of ammonia and a first reaction product, said first reaction product being derived from the reaction between a source of reactable formaldehyde, a formaldehyde scavenger, and an acidic furan resin resulting from the polymerization reaction wherein at least one reagent is selected from the group consisting of the furan containing molecule having the general formula

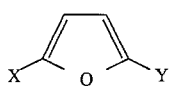

and its saturated analogs thereof having zero to one carbon-carbon double bonnets, wherein X and Y are independently comprised of organic molecular groups.

The invention further pertains to a method of decreasing formaldehyde in undesirable volatile organic compounds in furan resins, consisting of the steps of providing an acidic aqueous compatible furan resin, providing a source of reactable formaldehyde, mixing a formaldehyde scavenger with the furan resin in the presence of the source of reactable formaldehyde to form a first mixture, heating the first mixture to a temperature of less than 100° C. for a period of from one to ten hours, adding a source of ammonia to the first mixture to form a second mixture, and heating the second mixture to a temperature of less than 100° C. for a period of from one to ten hours.

DETAILED DESCRIPTION OF THE PREFERRED EMBODIMENT

The present invention provides furan resins having low levels of volatile organic compounds such as formaldehyde, furfuryl alcohol, dishydroxymethyl furan (BHMF) and the like. The claimed furan resin is aqueous compatible and is derived from the reaction between a source of ammonia and a first reaction product, where the first reaction product is derived from the reaction of a formaldehyde scavenger, a source of reactable formaldehyde, and an acidic furan resin.

The acidic furan resin may be generated in situ as part of the process of manufacture of the claimed furan resin. Alternatively, the acidic furan resin may be previously manufactured and commercially obtained as a finished furan resin. Thus, in its broadest sense, the invention can result in a wide variety of furan resins having low VOC levels.

In general, the acidic furan resin may be defined to encompass resinous products which are comprised of polymer molecules which contain the traditional furan ring structure as well as a saturated analog thereof. As used herein, the term "polymer molecules" encompasses monomers, oligomers and low and high molecular weight polymers. The analogs will consist of five membered rings having four carbons and one oxygen and zero to one carbon-carbon double bonds. The structures encompassed by this definition are illustrated below.

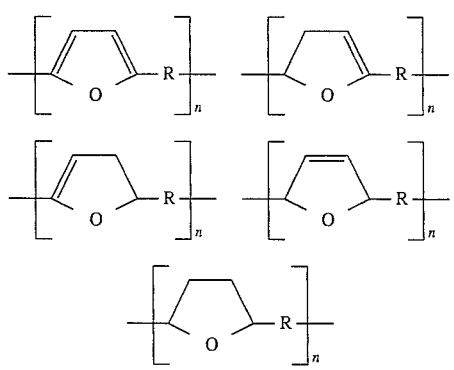

wherein R may be methylene; methylidyne; methylcarbonyl; methylester; methylene ether; methylene dioxy; ethylene; heterocyclic; polymeric methylene ether wherein R is $(CH_2\text{-}(OCH_2)_n\text{-})$ and n may be from 1 to 10; ethylene methyl carbonyl; ethylene methyl ester; methylene oxy; ethyl oxy; and hydroxy methyl. Of these, it is most preferred that R be methylene, methylene ether, or polymeric methylene ether wherein n is 1 to 5.

R may also be characterized as the residue resulting from the polymerization of at least one reactant selected from the group consisting of:
furan, furfural, furfuryl alcohol,
5-hydroxymethyl-2-furancarboxyaldehyde,
5-methyl-2-furancarboxyaldehyde; 2-vinyl furoate,
5-methyl-2-vinylfuroate, 5-tertbutyl-2-vinyl furoate,
2-furfurylmethacrylate, 2-furfuryl methylmethacrylate,
2-vinyl furan, 5-methyl-2-vinyl furan,
2-(2-propylene)furan (or 2-methyl vinylidene furan),
5-methyl-2-methyl vinylidenefuran,
furfurylidene acetone, 5-methyl-2-furfurylidene acetone,
2-vinyl tetrahydrofuran, 2-furyl oxirane,
5-methyl-2-furyloxirane, furfuryl vinyl ether,
5-methyl-furfuryl vinyl ether,
vinyl 2-furyl ketone,
bis-2,5-carboxyaldehyde furan,
bis-2,5-hydroxymethyl furan,
5-hydroxymethyl-2-ethyl furanacrylate,
2,5-furandicarboxylic acid,
5-hydroxymethyl-2-furan carboxylic acid,
2,5-furan diacid dichloride,
2,5-furan dicarboxylic acid dimethyl ester,
2,5-furan methylamine,
5-carboxy-2-furan amine,
5-methylester-2-furan amine,
bis-(2,5-methylene isocyanate)furan,
bis(2,5-isocyante)furan,
2-isocyanatefuryl, and
2-methylene isocyanate furyl.

It will be appreciated that the composition of R will vary greatly as it is dependent upon the identity of the starting reactants and the mechanism of polymerization; "n" may be any value greater than 1 but will most preferably be no greater than 25.

Although furan resins may be identified via the names of the starting reactants (i.e., furfuralphenol resin or furfuryl alcohol resin) the acidic furan resin is intended to encompass resins derived from a variety of starting reactants. Typically at least one of these reactants will contain the basic furan ring structure or the saturated analogs thereof. Accordingly, the term furan resin is further defined as a resinous mixture comprised of either monomers, oligomers, polymers and/or mixtures thereof, resulting from the polymerization reaction wherein at least one of the reactants is selected from the group consisting of the furan containing molecule having the general formula:

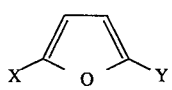

and its saturated analogs thereof having 0 to 1 carbon-carbon double bonds, wherein X and Y are independently organic substituent groups. This group is illustrated below:

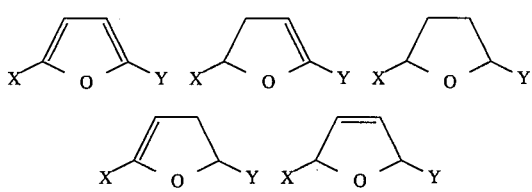

Suitable X and Y groups are those comprised of molecular species comprising one or more functional moieties selected from the group consisting of: hydrogen; $C_1$–$C_{10}$ alkyl groups; mono, di- or tri- substituted vinyl radicals; di- or tri-substituted aromatic rings; ketones; anhydrides; polysubstituted furfuryl; hydroxyls; aldehydes; carboxylic acids; esters; ethers; amines; amides; imines; imides; alkynes; alkyl halides; aromatic halides; olefinic halides; ethers; thiols; sulfides; nitriles; nitro groups; sulfones; carbofunctional siloxanes; and sulfonic acids. It will be appreciated that combinations of these various functional groups can be employed to form either X or Y.

Examples of specific compounds containing suitable X and Y groups include:
furan, furfural, furfuryl alcohol,
5-hydroxymethyl-2-furancarboxyaldehYde,
5-methyl-2-furancarboxyaldehyde, 2-vinyl furoate,
5-methyl-2-vinylfuroate; 5-tertbutyl-2-vinyl furoate,
2-furfurylmethacrylate, 2-furfuryl methylmethacrylate,
2-vinyl furan, 5-methyl-2-vinyl furan,
2-(2-propylene)furan (or 2-methyl vinylidene furan),
5-methyl-2-methyl vinylidenefuran; furfurylidene acetone,
5-methyl-2-furfurylidene acetone,
2-vinyl tetrahydrofuran, 2-furyl oxirane,
5-methyl-2-furyloxirane, furfuryl vinyl ether,
5-methyl-furfuryl vinyl ether,
vinyl 2-furyl ketone,
bis-2,5-carboxyaldehyde furan,
bis-2,5-hydroxymethyl furan,
5-hydroxymethyl-2-ethyl furanacrylate,
2,5-furandicarboxylic acid,
2,5-furan diacid dichloride,
2,5-furan dicarboxylic acid dimethyl ester,
2,5-furan methylamine,
5-carboxy-2-furan amine,
5-methylester-2-furan amine,
bis-(2,5-methylene isocyanate) furan,
bis(2,5-isocyante) furan,
2-isocyanate furyl, and
2-methylene isocyanate furyl.

It is preferred that X and Y be comprised of molecular species containing one or more functional moieties selected from the group consisting of hydrogen; C1–C6 alkyl groups; mono, di-, or tri- substituted vinyl radicals; ketones; hydroxyls; aldehydes; carboxylic acids; esters; ethers; amines; amides; imines, imide; and polysubstituted furfuryls.

It is furthermore particularly desired that at least one of X and Y be comprised of a molecular species comprising an oxygen containing functional moiety such as a ketone, hydroxyl, aldehyde, carboxylic acid, ester or ether.

It is most preferred that X and Y be comprised of methylol (—$CH_2OH$) terminated groups. Accordingly, a furan resin suitable for use as the acidic furan resin are those resins resulting from the polymerization of 2,5-bis(hydroxymethyl)furan. Such resins may be further defined as 'BHMF' resins.

These furan containing monomers can polymerize through two well known mechanisms. The first involves chain or polyaddition polymerization which is initiated by well known free radical, cationic or anionic promoters. This method of polymerization produces macromolecules with furan rings branching from the main chain. A comprehensive discussion of such reactions is provided by Agricultural and Synthetic Polymers, Biodegradability and Utilization; edited by J. E. Glass and G. Swift, Symposium sponsored by Divisions of Cellulose, Paper and Textile Chemistry; and Polymeric Materials: Science and Engineering at the 197th National Meeting of the American Chemical Society, Dallas, Tex., Apr. 9–14, 1989, herein incorporated by reference.

The second method is typically known as condensation polymerization. Polymers and copolymers resulting from acid catalyzed condensation reactions result in macromolecules with furan rings in the main chain. As a general rule, the furan resins formed by polycondensation reactions have stiffer chains and higher glass transition temperatures. These reactions may involve self condensation of the furan monomers described above, as well as condensation reactions of such monomers with aminoplast resins, organic anhydrides, aldehydes such as formaldehyde, ketones, urea, phenol and other suitable reagents. Most preferably the acidic furan resins described herein will be produced by acid catalyzed condensation reactions.

A most preferred resin for use herein as the acidic furan is Farez™ XP type 'M', as supplied by Q.O. Chemicals. The MSDS sheet for this resin indicates that it is a furfural alcohol-formaldehyde resin with 9% by weight formaldehyde. This resin generally has less than 2% furfuryl alcohol.

Suitable acidic furan resins will have an acidic pH from 3.5 to 6.0. Most preferably, the pH of the acidic furan resin will be from 3.8 to 4.5. If the acidic furan resin is not made in situ, and is to be a commercially available resin, the most preferred acidic furan resin will be Farez XP "M" having at least 7% free or residual formaldehyde.

If the acidic furan resin is to be generated in situ, at least one of the starting reactants should be a furan containing compound as described above. In addition, at least one of the other starting reactants should be formaldehyde. While other ratios of starting reactants are within the scope of the invention, it is preferred that a large excess of formaldehyde, relative to the furan containing compound, be utilized. Most preferably, a ratio of formaldehyde to the furan containing compound of approximately 3:1 is most preferred. These reactants will be combined in the presence of heat and an acid catalyst to obtain the acidic furan resin.

Suitable acid catalysts are well known in the art. Suitable catalysts include inorganic and organic acids, Friedel-Crafts type catalysts and inorganic and organic acid salts. Suitable examples of organic and inorganic acids include hydrochloric acid, sulfuric acid, nitric acid, phosphoric acid, benzene sulfonic acid, toluene sulfonic acid, xylene sulfonic acid, napthalene sulfonic acid, oleic acid, benzoic acid, salicylic acid, acetic acid, propionic acid, maleic acid, fumaric acid, oxalic acid, malonic acid, phthalic acid, lactic acid, succinic acid, glutaric acid, adipic acid, citric acid, tartaric acid and levulinic acid. Of these, organic acids such as tartaric acid and maleic acid are preferred with maleic acid most preferred.

In either case, the acidic furan resin is combined with a source of reactable formaldehyde and a formaldehyde scavenger to produce a first reaction product. This first reaction product is then reacted with a source of ammonia to produce a reaction product which is an aqueous compatible furan resin having low levels of VOCs and increased water compatibility.

The source of reactable formaldehyde may be formaldehyde, paraformaldehyde or any hemiformal containing solution or mixture. Reactable formaldehyde is defined as those formaldehyde molecules which are capable of volatilizing under manufacturing conditions or will react with a traditional formaldehyde scavenger. The formaldehyde may be supplied as an aqueous solution which may or may not be stabilized with methanol such as formalin. Such materials should be readily incorporated into the acidic furan resin. If paraformaldehyde is used, the mixture of the acidic furan resin and paraformaldehyde should be stirred until all of the paraformaldehyde is dissolved.

Alternatively, the source of reactable formaldehyde may be the acidic furan resin itself. As discussed above, some acidic furan resins may contain residual or unreacted formaldehyde, generally in the form of hemiformals. In such cases, the acidic furan resin may serve as the sole source of reactable formaldehyde. In other cases, the source of reactable formaldehyde may be a mixture of the acidic furan resin and an externally added amount of formaldehyde, paraformaldehyde or hemiformal.

In either case, the source of reactable formaldehyde should be present in an amount equal to or greater than the formaldehyde scavenger discussed below. When the acidic furan resin is Farez XP "M" it is most preferred that the source of reactable formaldehyde be present in an amount equal to 5–20 weight percent of the acidic furan resin and the source of reactable formaldehyde. Most preferably, when the acidic furan resin is Farez XP "M" the source of reactable formaldehyde will be present in an amount equal to 15 weight percent. It will be appreciated by those skilled in the art that the amount of reactable formaldehyde will vary with the particular acidic furan resin utilized and the amount of formaldehyde scavenger added.

Formaldehyde scavengers suitable for use in the instant invention are nitrogen containing organic compounds containing at least one amine group per molecule reactive with formaldehyde. Suitable examples include ammonia, primary and secondary amines, urea, substituted ureas, primary amides, dicyandiamide, guanidines and aminotriazines such as melamine, guanamine and benzo-guanamine.

In general, the amount of formaldehyde scavenger added will be limited by practical considerations, economics and desired performance properties. While economics will urge a maximization of the amount, the other two factors will argue for reductions. Most preferably, the formaldehyde scavenger should be present in an amount equal to 1.0 to 15.0 pph of the combination of the acidic furan resin solids and the source of reactable formaldehyde. However, amounts of up to 30 pph are within the scope of the invention. The preferred formaldehyde scavengers for use herein are melamine and urea. Of these, melamine is most preferred.

The formaldehyde scavenger may be added to the previously mixed acidic furan resin and source of reactable formaldehyde. Sufficient water is also added to obtain a mixture having a percent nonvolatile from 40 to 100% and most preferably from 45–95% nonvolatile.

The mixture of the acidic furan resin, the source of reactable formaldehyde and the formaldehyde scavenger may be termed the first mixture. This first mixture should be subjected to a temperature of less than 100° C. for a period of from 1–10 hours. Preferably, the first mixture will be heated to and maintained at a temperature which is between 75°–95° C. for a period of between 1–5 hours. Most preferably, the first mixture will be heated to a temperature between 80°–85° C. for approximately one hour.

Those skilled in the art will appreciate that at higher temperatures the period of heating will be decreased, while at lesser temperatures, the period of heating will be increased. Those skilled in the art will also appreciate that the % N.V. concentration will have a similar effect on the rate of reaction. The more water, the slower the reaction. Although the use of a water bath is indicated in Examples 1 and 2, those skilled in the art will appreciate that a variety of heating apparatus may be used.

At the completion of this first heating stage, the mixture is termed the first reaction product. Most preferably it will be cooled to a temperature of approximately 40° to 60° C.

While this is not believed to be necessary to the desired mechanism of reaction, those skilled in the art will appreciate that such cooling will decrease the production of vapors arising from the addition of the source of ammonia to the first reaction product.

The source of ammonia may be any material which upon addition to the first product, produces $NH_3$. Preferably, the source of ammonia will be such that upon addition to the mixture, the pH will rise or stay constant. The most preferred source of ammonia to be added to the first reaction product is $NH_4OH$.

Although the pH of the first reaction product will probably increase in the presence of ammonia, the pH should remain acidic. Most preferably, the pH of the 'second' mixture resulting from the addition of the source of ammonia should be between 5.0 to 6.5. In general, the source of ammonia should be supplied in a quantity such that $NH_3$ is present in an amount from 1–15% parts by weight $NH_3$ per hundred parts of the combination of the furan resin solids, formaldehyde scavenger and any externally added source of reactable formaldehyde. Most preferably, 7–8% pph $NH_3$ will be utilized for an acidic resin such as Farez XP "M" as illustrated in Example 1.

After the source of ammonia is mixed with the first reaction product, the resulting mixture should be subjected to a second heating stage. The reactants are cooked at a temperature of less than 100° C. for a period of 1–10 hours. Preferably, the reactants will be heated to and maintained at a temperature of between 75°–95° C. for a period of from 1–6 hours. Most preferably, the reactants will be heated to and maintained at a temperature of 85° C. for a period of four hours. Those skilled in the art will appreciate that at lower temperatures, the period of heating will be increased, while at higher temperatures, the period of heating will be decreased.

The mixture resulting at the end of the second heating stage will be an aqueous compatible furan resin having low VOC levels and increased water compatibility.

While not wishing to be bound by any particular theory, it is believed that this second heating stage results in a reduction of the hexamethylene tetramine concentration. Note, however, that while a final concentration of 0% hexa is the theoretical ideal, Example 1 indicates that hexa concentrations of less than 3 are desirable. Concentrations of less than 1.0 are most desired.

Below is the most preferred formulation for the furan resin of the instant invention:

| Most Preferred Formulation | |
| --- | --- |
| Acidic furan resin solids (Farez XP "M") | 89 parts by weight |
| Paraformaldehyde | 3.5 parts by weight |
| Urea | 7.5 parts by weight |
| $NH_3$ (added as $NH_4OH$) | 3.8 parts by weight |

Although not wishing to be bound by any particular theory, it is believed that the instant invention achieves aqueous compatible furan resins having low VOC levels and increased water compatibility, without an increase in nondesireable species like hexa, because of the following reaction mechanism. Those skilled in the art will appreciate that given the complex and competing nature of the various reactions, these mechanisms are expected only.

It is believed however, that the first reaction between the acidic furan resin, the formaldehyde scavenger and the reactable formaldehyde, primarily results in the formation of monomethylol urea (MMU) and dimethylol urea (DMU). Polymerization of the MMU and the DMU is expected to continue so as to result in the formation of polyMMU and polyDMU oligomers. However, it is also anticipated that there is a competing reaction between the MMU and DMU species and hydroxyl containing species such as BHMF. This proposed reaction mechanism is supported by the evidence showing that increasing the first heating stage appears to decrease water compatibility and limit shelf life.

The second heating stage is believed to cause the source of ammonia to react with any residual formaldehyde to produce hexamethylene tetramine. However, as indicated above, the hexa concentration decreases during the second reaction. It is believed that the undesirable high molecular weight portion of the original acidic furan resin is solubilized during this second reaction. It is anticipated that the reduction in hexa is tied to a modification of the furan backbone.

The following examples are intended to illustrate the invention, but are not intended to limit the invention. All degrees are Centigrade and all parts are weight percent unless otherwise indicated.

EXAMPLE 1

An aqueous compatible furan resin having low levels of VOCs was made according to the instant invention. The acidic furan resin used was available from Q.O. Chemicals as Farez XP "M". It had a pH of 3.8 and contained 6.4% water. 89 parts Farez XP "M" furan resin solids was mixed with 3.5 parts paraformaldehyde and stirred until the paraformaldehyde dissolved. 7.5 parts of urea were then added. The mixture was placed in a beaker and water added such that the solids level was adjusted to 80%. The beaker was covered and placed in a water bath at a temperature of 85° C. The reactants were heated to and maintained at 85° C. for up to two hours. Sample aliquots were taken after one hour and two hours. The samples were cooled to about 50 degrees C. and then frozen for later analysis of VOC levels. Analysis of the one hour sample indicated that FA= 0.31%, BHMF=29.16%, 5mF=0.15%, and furfural=0.16%. Analysis of the two hour sample showed, FA=0.19%, BHMF= 19.99%, 5mF=0.15%, and furfural=0.15%. (Note, these values and those below are in % by weight of acidic furan resin solids.)

The remaining one and two hour samples which had been cooled but had not been frozen were then treated with 3.8 parts ammonia. The source of ammonia was a $NH_4OH$ solution having 30% $NH_3$ by weight in water. Each sample was then placed in a water bath at 85 C. for one hour. Analysis of the resulting furan resin showed the following VOC levels: FA=0.18%, hexa=0.83%, BHMF=21.57%, 5mF=0.14%, furfural=0.09%, $CH_2O$= 1.91% for the one hour urea sample and FA=0.15%, BHMF= 18.92%, 5mF= 0.14%, furfural=0.10%, hexa=0.41%, $CH_2O$<1.0% for the two hour urea sample. The sample that had been treated for one hour with urea and then one hour with ammonia showed a marked improvement in water compatibility with only traces of insolubles when used in an aqueous binding composition having 6 and 20% solids. The furan resin that had been treated for two hours with urea and then one hour with ammonia showed significant amounts of water insolubles.

EXAMPLE 2

A second aqueous compatible furan resin having low VOC levels was made according to the invention. The acidic furan resin used was Farez XP "M". It had a pH of 3.8 and contained 6.4% water. 89 parts Farez XP "M" furan resin solids was mixed with 3.5 parts paraformaldehyde and stirred until dissolved. 7.5 parts melamine was added along with water to produce 80% solids. The material was placed in a water bath at 85° C. for up to two hours. Analysis of samples taken after one hour indicated that the FA=0.00%, BHMF=16.79%, 5mF=0.16%, furfural=0.16%. The sample taken after two hours showed FA=0.29%, BHMF=25.53%, 5mF=0.17%, furfural=0.14%. (Note these values and those below are in percent by weight of furan resin solids.)

The remaining one and two hour samples were then cooled to 50 C. and treated with 3.8 parts ammonia from an $NH_4OH$ solution having 30% $NH_3$ by weight of water. Each sample was then placed in a water bath at 85 C. for an additional one hour. Analysis of the resulting furan resin showed FA=0.00%, BHMF=15.17%, 5mF=0.13%, furfural=0.11%, hexa=0.42% for the one hour melamine sample and FA=0.00%, BHMF=17.79%, 5mF=0.15%, furfural=0.09%, hexa=0.96% for the two hour melamine sample. The resins that had undergone the melamine and then ammonia treatment showed no resinous insolubles on dilution with water.

While the best modes for carrying out the invention have been described in detail, those familiar with the art to which the invention relates will recognize various alternative designs and embodiments for practicing the invention as defined by the following claims.

What is claimed is:

1. A method of decreasing formaldehyde and undesirable volatile organic compounds in furan resins, comprising the steps of:

providing an acidic furan resin;

providing a source of reactable formaldehyde;

mixing a formaldehyde scavenger with the acidic furan resin in the presence of the source of reactable formaldehyde to form a first mixture;

heating the first mixture to a temperature of less than 100 degrees C. for a period of from 1 to 10 hours;

adding a source of ammonia to the first mixture to form a second mixture;

heating the second mixture to a temperature of less than 100 degrees C. for a period of from 1 to 10 hours; and wherein, the undesirable, volatile, organic compound is comprised of a hydroxy methyl furan and after the heating of the second mixture, the amount of hydroxy methyl furan present in the mixture is less than the amount present in the first mixture.

2. A method of claim 1 where the step of providing an acidic furan resin comprises providing the reaction product resulting from the polymerization reaction wherein at least one reagent is selected from the group consisting of the furan containing molecule having the general formula:

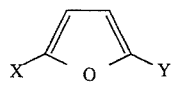

and its saturated analogs thereof having 0 to 1 carbon-carbon double bonds, wherein X and Y are independently comprised of organic molecular groups comprising one or more functional moieties selected from the group consisting of hydrogen, $C_1$–$C_{10}$ alkyl groups, polysubstitued vinyl radicals, polysubstituted aromatic groups, ketones, anhydrides, polysubstituted furfuryl, hydroxyls, aldehydes, carboxylic acids, esters, ethers, amines, amides, imines, imides, alkynes, alkyl halides, aromatic halides, olefinic halides, ethers, thiols, sulfides, nitriles, nitro groups, sulfones, sulfonic acids, carbofunctional siloxanes, and mixtures thereof.

3. The method of claim 1 where the step of providing a source of reactable formaldehyde comprises providing an acidic furan resin.

4. The method of claim 1 where the step of providing a source of reactable formaldehyde comprises adding at least a portion of the source of reactable formaldehyde to the acidic furan resin, said source being selected from the group consisting of formaldehyde, paraformaldehyde, aqueous solutions of formaldehyde, and formaldeyde based hemiformals.

5. The method of claim 1 where the step of mixing a formaldehyde scavenger comprises mixing a formaldehyde scavenger selected from the group consisting of nitrogen containing organic compounds containing at least one NH group per molecule reactive with formaldehyde.

6. The method of claim 5 where the step of mixing comprises mixing a formaldehyde scavenger selected from the group consisting of ammonia, primary and secondary amines, urea, primary amides, dicyandiamide, guanidines and aminotriazines.

7. The method of claim 1 where the step of heating the first mixture further comprises heating the mixture to a temperature between 75 to 95 degree C. for a period of from 1 to 5 hours.

8. The method of claim 7 where the step of heating the first mixture comprises heating the mixture for 1 hour at 85 degree C.

9. The method of claim 1 where the step of adding a source of ammonia comprises adding $NH_4OH$.

10. The method of claim 1 where the step of heating the second mixture comprises heating the mixture to a temperature between 75 to 95 degree C. for a period of from 1 to 5 hours.

11. The method of claim 1 where the step of adding a source of ammonia further comprises adding a sufficient amount of a source of ammonia such that $NH_3$ is present in an amount from 1 to 15% by weight of resin solids.

12. The method of claim 1 wherein resinous mixture that is obtained can be characterized as substantially water soluble.

13. A method of decreasing formaldehyde and undesirable volatile organic compounds furan resins, comprising the steps of:

providing an acidic furan resin;

providing a source of reactable formaldehyde;

mixing a formaldehyde scavenger with the acidic furan resin in the presence of the source of reactable formaldehyde to form a first mixture;

heating the first mixture to a temperature of less than 100 degrees C. for period of from 1 to 10 hours;

adding a source of ammonia to the first mixture to form a second mixture;

heating the second mixture to a temperature of less than 100 degree C. for a period of from 1 to 10 hours; and wherein the pH of the final resinous composition is between about 5.0 to 6.5 and the amount of the ammonia that is added is in the amount of 1 to 15% by weight $NH_3$ per 100 parts of the combination of furan resin solids, formaldehyde scavenger and an externally added source of reactable formaldehyde.

* * * * *